United States Patent [19]
Borsanyi

[11] 3,863,504
[45] Feb. 4, 1975

[54] PRESSURE GAUGE PROTECTOR ASSEMBLY AND METHOD

[75] Inventor: Alexander S. Borsanyi, Irvine, Calif.

[73] Assignee: American Hospital Supply Corporation, Evanston, Ill.

[22] Filed: Mar. 9, 1973

[21] Appl. No.: 339,516

[52] U.S. Cl. ............................................. 73/395
[51] Int. Cl. .......................................... G01l 7/08
[58] Field of Search ................. 73/395, 406, 152; 128/2.05 D, 2.05 E

[56] References Cited
UNITED STATES PATENTS

| | | | |
|---|---|---|---|
| 2,645,128 | 7/1953 | Walker et al. | 73/395 |
| 3,365,949 | 1/1968 | Robinson | 73/406 |
| 3,635,089 | 1/1972 | Harding et al. | 73/395 |

*Primary Examiner*—Donald O. Woodiel

[57] ABSTRACT

A pressure gauge protector assembly is provided for measuring the pressure of a fluid without having the fluid come into direct contact with the pressure-measuring gauge. The assembly includes a transparent casing having an inner cavity in which a flexible diaphragm is mouunted to divide the cavity into two chambers. One of the chambers is provided with inlet and outlet openings so that the fluid to be measured can flow through the first chamber, and the second chamber is provided with an opening which is connected to a pressure-measuring gauge by a fluid conduit. The pressure of the fluid to be measured displaces the flexible diaphragm from its original unflexed position, and fluid injecting means are connected to the fluid conduit for injecting fluid into the second chamber until the diaphragm is displaced toward its original position against the pressure of the fluid in the first chamber. The pressures of the fluids within the two chambers are then equal, and the pressure-measuring gauge will indirectly measure the pressure of the fluid within the first chamber.

6 Claims, 4 Drawing Figures

PATENTED FEB 4 1975   3,863,504

PRESSURE GAUGE PROTECTOR ASSEMBLY AND METHOD

BACKGROUND

This invention relates to a device for measuring the pressure of fluids, and, more particularly, to a device which measures the pressure of a fluid while isolating and protecting the measuring gauge from the fluid.

It is frequently desirable to measure the pressure of fluids which should be kept out of contact from the pressure-measuring gauge for any of a number of reasons. For example, when measuring the pressure of plasma, blood, or other body fluids, such a fluid must not be introduced into a conventional pressure gauge which would interfere with continuous circulation of the fluid and which would tend to have a traumatic effect on blood components. Further, such a gauge might contaminate the fluid unless the gauge were sterilized before each use; also, some fluids might corrode such a gauge under prolonged contact. When measuring the pressure of fluids which must not be contaminated, such as plasma circulating in an organ perfusion system, it is desirable to use a device which is economical enough to permit disposal after each use but which provides accurate and reliable pressure determinations.

SUMMARY

The invention provides a gauge protector assembly and a method of measuring fluid pressure which permits the pressure of fluids to be measured without allowing the fluid to stagnate or to contact the measuring gauge. The casing through which the fluid flows is formed separately from the reaminder of the assembly and is disposable after each use. Even though the casing is replaced before another fluid is measured, the assembly can be connected for pressure determinations quickly and easily. After one of the chambers of the casing is connected in line with the flowing fluid, the other chamber of the casing is connected to a conduit attached to a pressure gauge. The assembly can then be prepared for pressure measurements merely by injecting a fluid such as air into the conduit until the diaphragm is displaced toward its original position against the pressure of the flowing fluid. When the diaphragm begins to return to its original unflexed position under the pressure provided by the fluid injecting means, the pressures within the two chambers are equal, and the pressure gauge will indicate the pressure of the flowing fluid.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
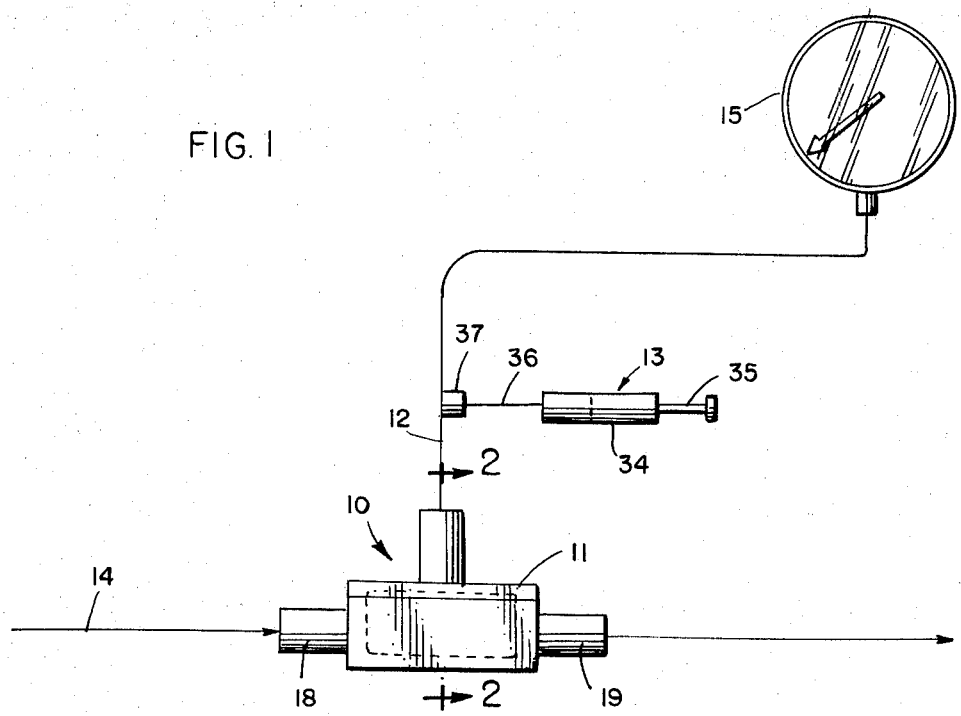
FIG. 1 is a diagrammatic view of the gauge protector assembly showing the disposable gauge protector in side elevational view.

Referring now to the drawing, the numeral 10 designates generally a gauge protector assembly which includes a gauge protector 11, a fluid conduit 12, and fluid injecting means 13. The gauge protector 11 is adapted to be connected to a fluid conduit 14 through which the fluid which is to be measured flows. A conventional pressure gauge 15 is connected to the fluid conduit 12.

The gauge protector 11 includes a hollow body or casing 16 having an interior cavity 17 and three outwardly extending tubes 18, 19, and 20. In the particular embodiment illustrated, the casing is formed by a box-like base 21 and a cover 22. The base includes a bottom wall 23, side walls 24 and 25, and end walls 26 and 27 having openings through which the tubes 18 and 19, respectively, are inserted. The cover 22 includes a top wall 28 having a suitable opening through which the tube 20 is inserted and a depending perimetric flange 29 which extends downwardly slightly beyond the lower surface of the top wall 28.

Figure 2:
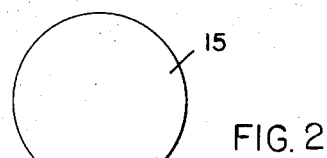
FIG. 2 is a vertical sectional view through the gauge protector and illustrates a modified fluid injecting means.
Figure 3:
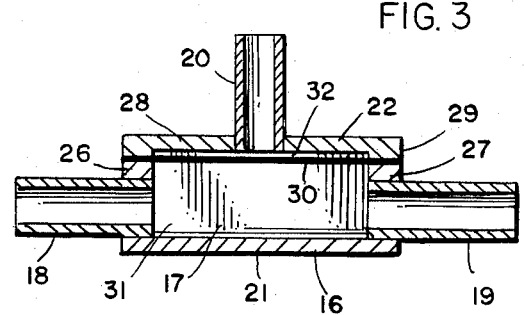
FIG. 3 is a sectional view of the gauge protector taken along the lines 3—3 of FIG. 2.
Figure 4:
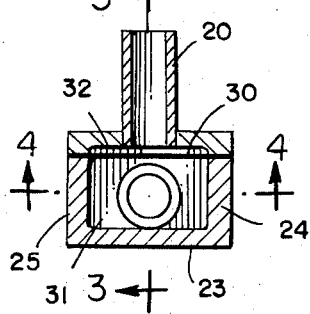
FIG. 4 is a sectional view of the gauge protector taken along the line 4—4 of FIG. 2.
Figure 4:
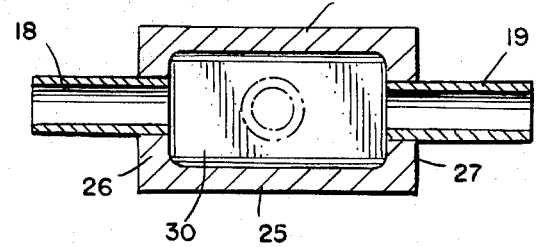

A flexible diaphragm or membrane 30 is positioned within the cavity of the casing and is clamped between the flange 29 of the cover and the upper periphery of the base 21 so that the diaphragm extends generally parallel to the top and bottom walls of the casing when in its neutral or unflexed position as shown in FIGS. 2 and 3. The depending perimetric flange 29 on the cover provides a space between the diaphragm and the top wall of the cover to permit the diaphragm to be flexed upwardly without contacting the top wall. The diaphragm divides the cavity of the casing into two chambers, a lower chamber 31 between the diaphragm and the bottom wall 23 and an upper chamber 32 between the diaphragm and the top wall 28, and the diaphragm extends generally parallel to the direction of fluid flow through the lower chamber.

At least a portion of the casing is transparent or translucent to permit the position of the diaphragm to be observed from outside of the casing, and I have found it advantageous to mold both the base and the cover from transparent plastic which is resistant to the fluid which will flow through the casing.

The conduit 12 is suitably connected to the tube 20 which communicates with the upper chamber 32 and is also connected to the gauge 15. I have found it advantageous to use a flexible rubber hose as the conduit 12, and the hose can be connected to the tube 20 merely by stretching the hose over the tube.

The fluid injecting means 13 illustrated in FIG. 1 comprises a conventional syringe having a barrel 34, a plunger 35, and a needle 36. The conduit 12 is provided with a conventional syringe septum 37 through which the needle of the syringe can be inserted to inject fluid into the conduit, and the septum is self-sealing when the needle is withdrawn. If the conduit 12 is formed of a self-sealing rubber tube, the septum can be eliminated and the needle can be inserted directly into the tube.

Other injecting means for introducing fluid into the conduit 12 can also be used. For example, in FIG. 2 the injecting means 13' comprises a hand pump 38 which is connected to the conduit 12 by a line 39 in which a stopcock or valve 40 is interposed.

When it is desired to measure the pressure of the fluid flowing through the line 14, the tubes 18 and 19 of the gauge protector are connected to the line 14 so that the fluid flows through the lower chamber 31. In the illustration given, the fluid flows from left to right through tube 18 which serves as the inlet opening, through the lower chamber 31, and out through the tube 19 which serves as the outlet opening. The gauge 15 is then connected to the upper chamber 32 by means of the conduit 12. As soon as fluid begins flowing through the lower chamber 31, the diaphragm 30 is displaced upwardly under the influence of the pressure of this fluid. In order to safeguard against rupture of the diaphragm in the event that the pressure of the flowing fluid is relatively high, the flange 29 on the cover of the casing can be made relatively small so that the diaphragm will engage the top wall of the casing before it is excessively stretched.

After the gauge is connected to the conduit 12, fluid is injected into the conduit by the injecting means 13. Fluid is injected into the conduit until the pressure of the fluid within the conduit and upper chamber 32 is raised sufficiently to displace the diaphragm toward its original horizontal position. If the diaphragm engages the top wall of the casing, fluid should be injected at least until the diaphragm is displaced downwardly away from the top wall. However, it is not necessary to force the diaphragm all the way back to its original, unflexed position. If the diaphragm is not engaging the top wall before fluid is injected into the upper chamber, it is only necessary to inject enough fluid to begin to move the diaphragm back towards its original unflexed position. When the diaphragm begins to return to its original position, the pressures within the upper and lower chamber are equalized. The position of the diaphragm can be observed through the transparent portion of the casing.

The gauge 15 directly reads the pressure of the fluid within the upper chamber and the conduit 12 and therefore indirectly reads the pressure of the fluid flowing through the lower chamber 31. If the pressure within the lower chamber fluctuates, the pressure in the upper chamber will fluctuate correspondingly due to movement of the diaphragm, and the pressure gauge will at all times provide an accurate reading of the pressure of the fluid flowing through the lower chamber.

I have found that it is particularly advantageous to use air as the fluid within the upper chamber and the conduit 12 rather than some other fluid, either liquid or gas. When air is used, the conduit 12 and the upper chamber need not be filled before the gauge is connected and in the case of reusable components 12, 37 and 15, such components may if desired be easily sterilized prior to use. Similarly, the syringe and its contents (air) may easily be sterilized before use. If a leak should develop in the diaphragm, air, in contrast to some noncompressible fluid, would generally not seriously contaminate the fluid flowing through the lower chamber. Further, air, being compressible, helps to dampen variations in the pressure of the flowing fluid, for example, when the fluid flow is pulsatile.

The fluid flowing through the line 14 flows only through the lower chamber of the gauge protector, and such fluid therefore does not come into contact with either the conduit 12 or the gauge 15. To avoid contamination of the flowing fluid, only the gauge protector 11 need be sterilized under normal circumstances. Possible leakage, as described above, would occur only through diaphragm failure and such failure would in turn occur only through excessive wear. Because of its simplicity and low cost, the gauge protector can be discarded after the desired measurements of a particular fluid are taken, and the conduit, injecting means, and gauge can be reused with another gauge protector at some later date when the need arises. Since the protector is discarded after a single use, the danger of contamination through diaphragm fatigue and failure are virtually non-existent.

The fluid flows in a substantially straight path through the casing, and there is little likelihood that even fluids such as plasma and blood will stagnate in a static area within the lower chamber. When the gauge protector is to be used with plasma or blood, the casing and the diaphragm may be formed of or coated with non-thrombogenic material. I have had good results in forming the diaphragm from silicone rubber film having a thickness of the order of about 0.005 to about 0.010 inch. The film may be colored if desired to provide better visibility through the casing.

When a syringe is used with a self-sealing member such as a septum or self-sealing rubber hose, the syringe can be disconnected from the conduit after the appropriate amount of fluid is injected. When using the hand pump 38 shown in FIG. 2, the stopcock 40 can be closed after sufficient fluid is pumped into the conduit 12.

While in the foregoing specification, a detailed description of a specific embodiment of the invention was set forth for the purpose of illustration, it is to be understood that many of the details herein given may be varied considerably by those skilled in the art without departing from the spirit and scope of the invention.

I claim:

1. A gauge protector assembly for measuring the pressure of a fluid by a gauge without having the fluid contact the gauge comprising a casing having an inner cavity and inlet and outlet openings communicating with the cavity, a flexible diaphragm secured to the casing within the cavity and dividing the cavity into first and second chambers, at least a portion of the casing being transparent to permit the diaphragm to be observed from outside of the casing, both of the inlet and outlet openings communicating with the first chamber but not the second chamber to provide a first fluid flow passage through the first chamber between the inlet and outlet openings, the casing being provided with a third opening communicating with the second chamber but not the first chamber, conduit means connected to the third opening and adapted to be connected to a pressure gauge to provide a second fluid flow passage through the third opening between the second chamber and the conduit means, and means for injecting a fluid into the second fluid flow passage whereby the fluid to be measured can be connected to the first fluid flow passage so that the pressure thereof acts on the diaphragm and fluid can be injected into the second fluid flow passage by the fluid injecting means until the pressures in the first and second chambers are equal.

2. The structure of claim 1 in which the injecting means is a syringe.

3. The structure of claim 2 in which the conduit is provided with a self-sealing puncturable member through which the syringe is inserted.

4. The structure of claim 1 in which the fluid injected by the injecting means is air.

5. The structure of claim 1 in which the diaphragm is formed of silicone rubber.

6. The structure of claim 1 in which the inlet and outlet openings are generally aligned and the diaphragm is substantially flat when unflexed and extends generally parallel to the direction of flow between the inlet and outlet openings.

* * * * *